F. G. NELSON.
LOCK STRUCTURE.
APPLICATION FILED FEB. 4, 1914.
1,193,412.
Patented Aug. 1, 1916.
5 SHEETS—SHEET 1.
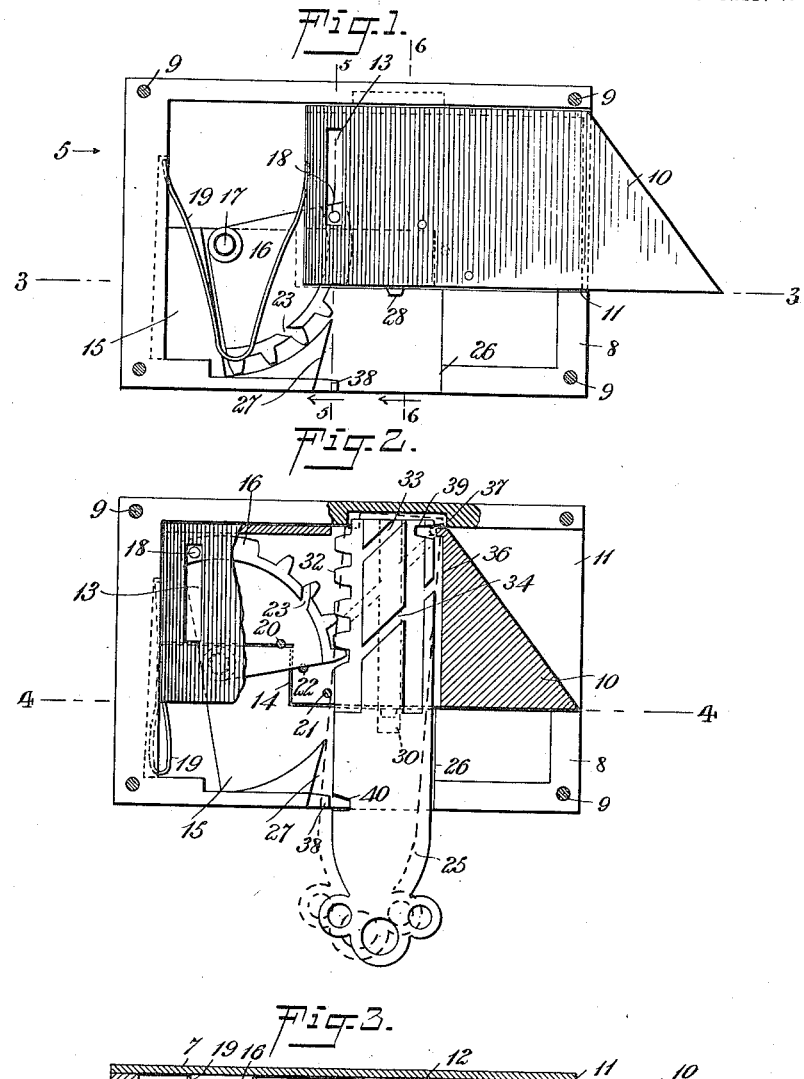
WITNESSES
William P. Gaebel.
John E. Burch.
INVENTOR
Frank G. Nelson
BY
Munn & Co
ATTORNEYS

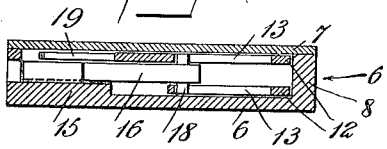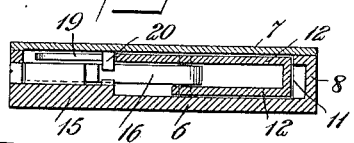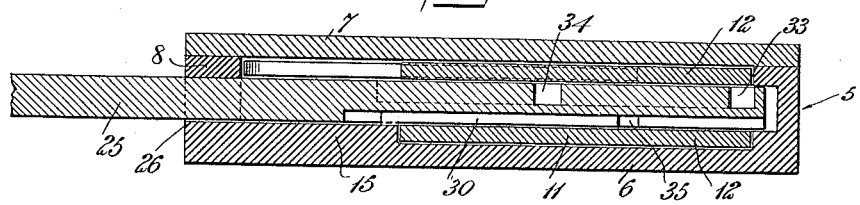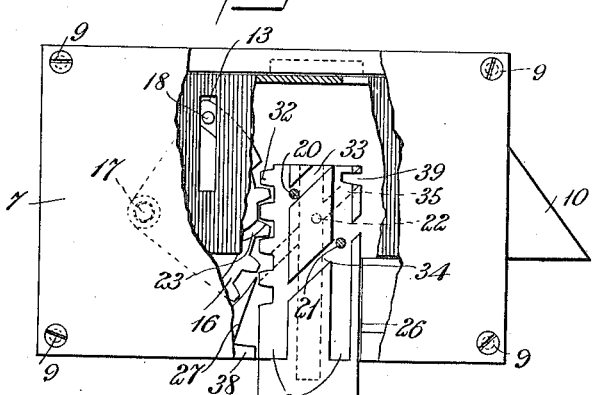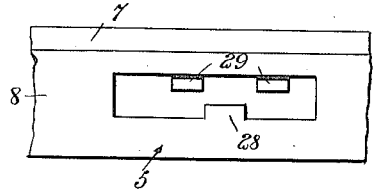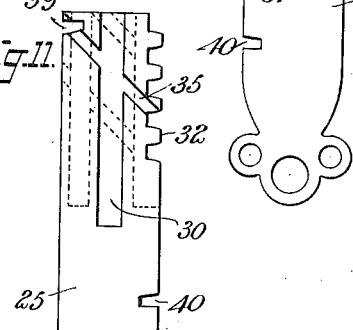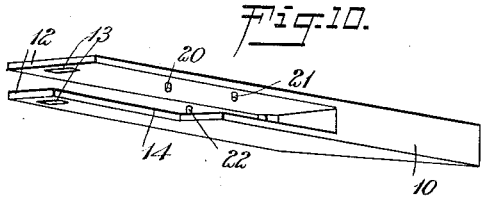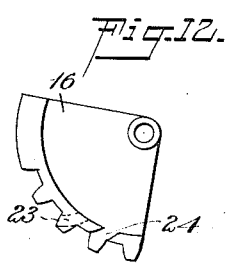

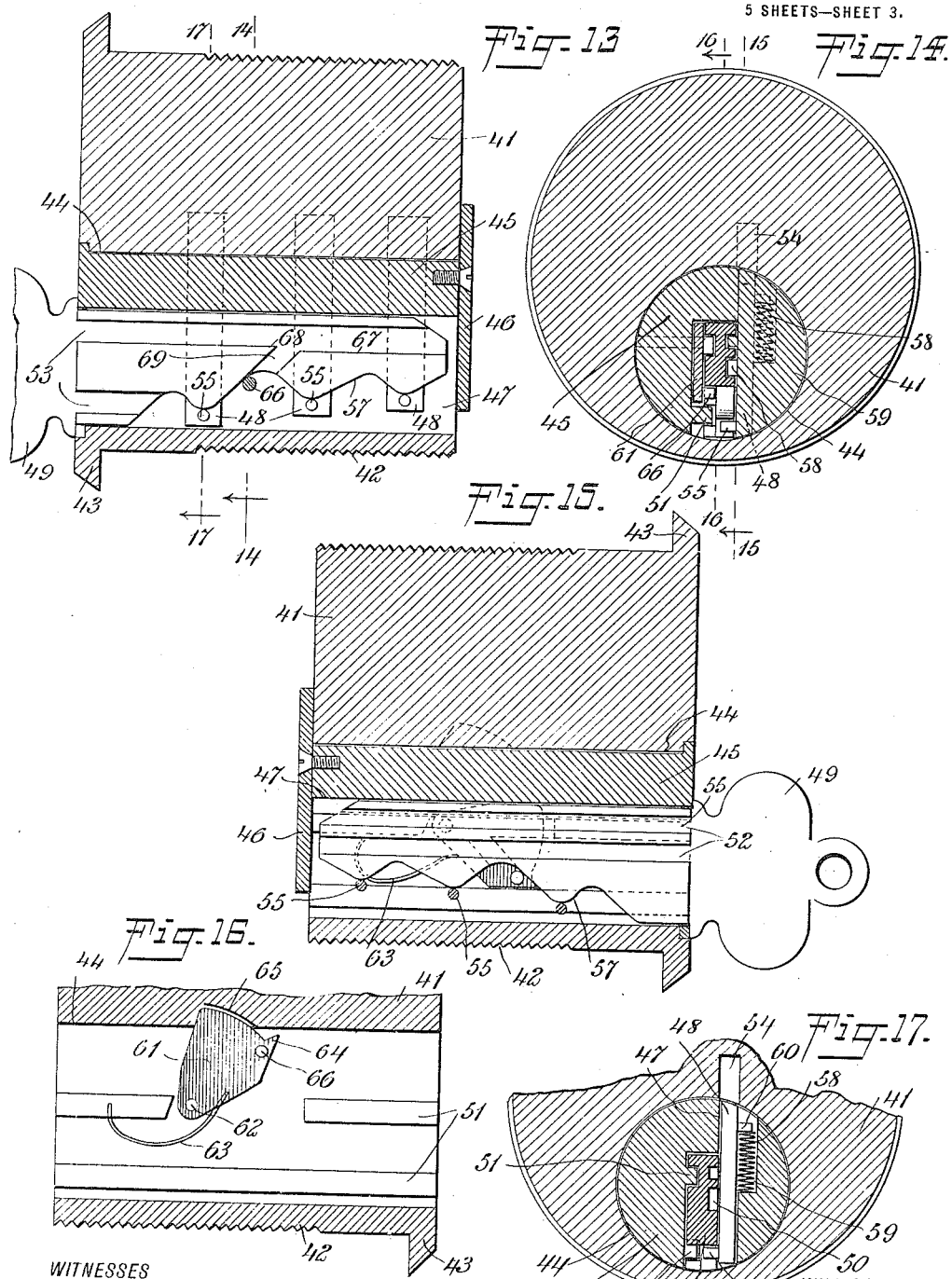

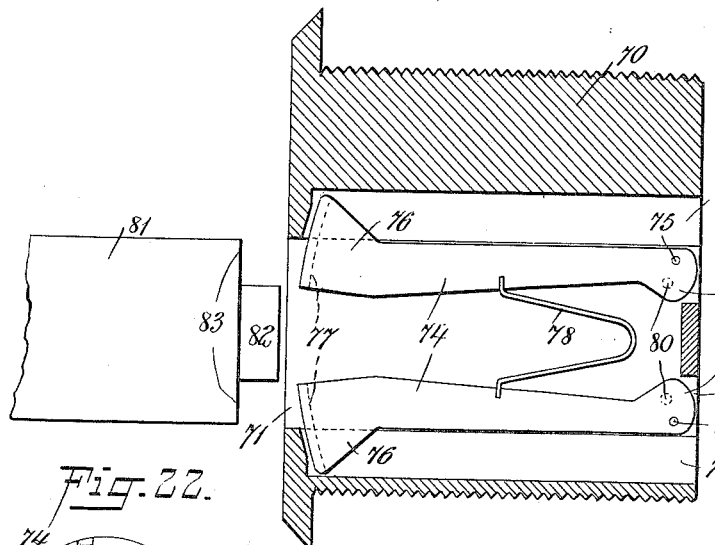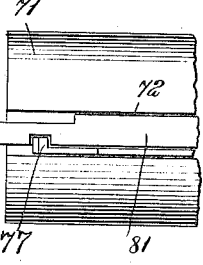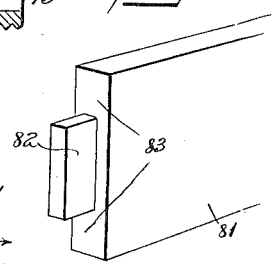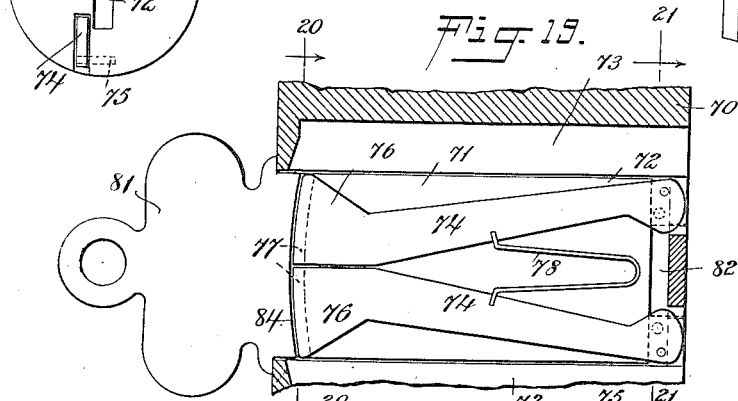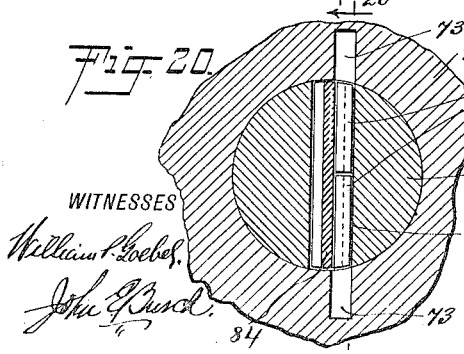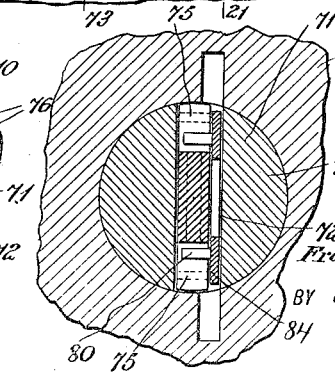

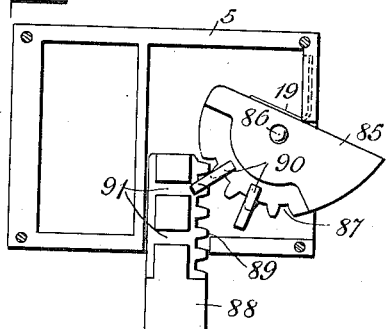
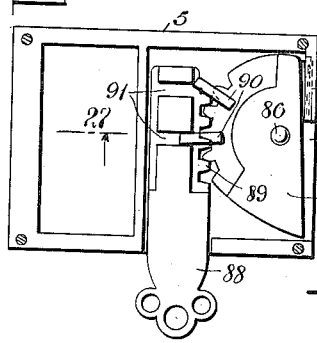
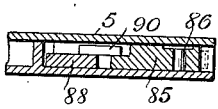
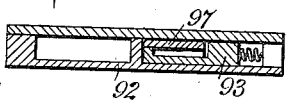
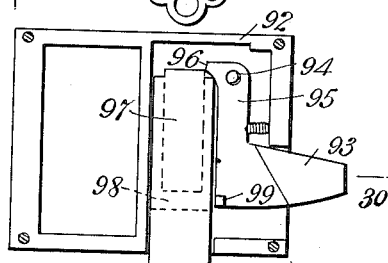
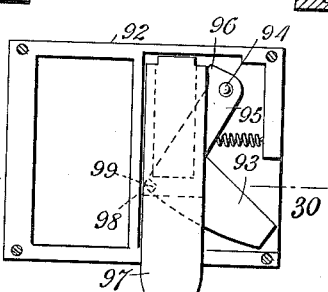
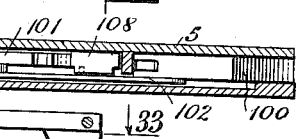
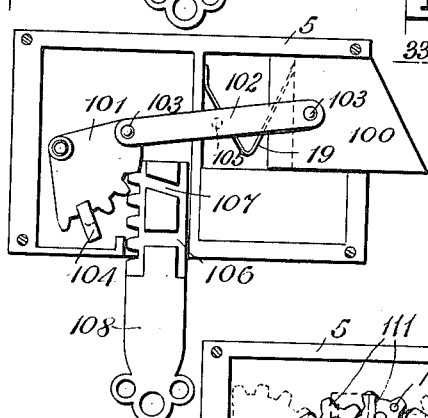
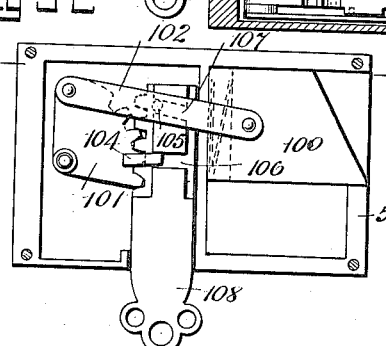
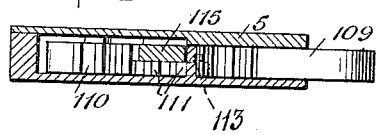
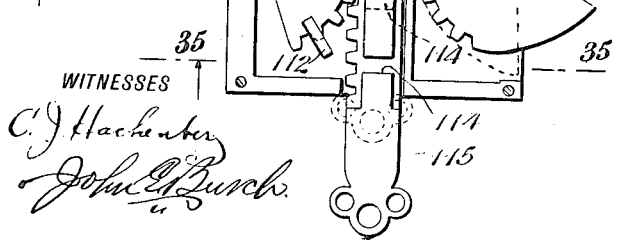

UNITED STATES PATENT OFFICE.

FRANK G. NELSON, OF NEW YORK, N. Y.

LOCK STRUCTURE.

1,193,412.  Specification of Letters Patent.  Patented Aug. 1, 1916.

Application filed February 4, 1914. Serial No. 816,527.

*To all whom it may concern:*

Be it known that I, FRANK G. NELSON, a citizen of the United States, and a resident of the city of New York, borough of Manhattan, in the county and State of New York, have invented a new and Improved Lock Structure, of which the following is a full, clear, and exact description.

This invention has special reference to improvements in lock structures and more particularly to improved means for shifting the bolt of a lock or for permitting rotation of a rotatable barrel, as in the ordinary cylinder lock, and the invention comprehends an improved mechanism controlling the shifting of the bolt or the rotation of the barrel according to the particular type of the lock.

A further object of the invention is to provide a controlling device of the above character, in which the bolt or barrel is designed to be operated by the insertion of a key having suitable transverse grooves on one or both sides for the passage of barrier pins or barrier fins projecting from the bolt or other movable parts of the lock, so that when the key is inserted, the co-action of these parts will permit the bolt to be withdrawn or the barrel to be rotated in the operation of the lock.

A further object of the invention resides in the provision of an additional means for causing the shifting of a bolt, such means embodying a segmental pinion and rack, the pinion being carried within the casing and slidably engaged with the bolt, while one edge of the key is provided with a rack designed to partially rotate the pinion whereby the latter through its engagement with the bolt will cause the withdrawal or the projection of the latter.

With the above and other objects in view the invention resides more particularly in the peculiar combination and arrangement of the parts which will be illustrated as a preferred embodiment in the accompanying drawings and described in the specification.

Reference is to be had to the accompanying drawings forming a part of this specification, in which like characters of reference indicate corresponding parts in all the views, and in which—

Figure 1 is a plan view of a lock having a sliding bolt designed to be operated in accordance with the invention, one side of the casing of the lock being removed to show the interior structure; Fig. 2 is a similar view but showing the key inserted and the bolt drawn, a portion of the bolt being broken away and part of the casing being shown in section; Fig. 3 is a sectional view taken on the line 3—3 of Fig. 1; Fig. 4 is a sectional view taken on the line 4—4 of Fig. 2; Fig. 5 is a sectional view taken on the line 5—5 of Fig. 1; Fig. 6 is a sectional view taken on the line 6—6 of Fig. 1; Fig. 7 is an enlarged longitudinal sectional view of the lock structure with the key inserted and showing the arrangement of grooves in the latter; Fig. 8 is a plan view of the lock with part of the casing broken away, the key being partially inserted and the bolt partially drawn; Fig. 9 is a fragmentary edge elevation of the lock, showing the guide lugs of the key; Fig. 10 is a detail perspective view of the bolt; Fig. 11 is a plan view of the key from the side opposite to that disclosed in Figs. 2 and 8 of the drawings; Fig. 12 is a plan view of the segmental gear looking toward the side opposite to that disclosed in Figs. 1 and 2; Fig. 13 is a vertical sectional view of a fragmentary portion of the lock having a rotatable barrel with barrier pins and barrier fins designed to be withdrawn by the insertion of a key upon the same principle as the operation of the bolt in the aforesaid structure; Fig. 14 is a vertical sectional view taken on the line 14—14 of Fig. 13; Fig. 15 is a vertical sectional view taken on the line 15—15 of Fig. 14; Fig. 16 is a vertical sectional view of a fragmentary portion of the lock taken on the line 16—16 of Fig. 14; Fig. 17 is a fragmentary vertical sectional view taken on the line 17—17 of Fig. 13; Fig. 18 is a vertical sectional view of a similar type of lock employing barrier planes each pivoted to the rotatable barrel, a modified form of key being shown in entering position; Fig. 19 is a similar fragmentary view with the parts in position after the key is inserted for withdrawing the planes and fins carried thereby from the stationary part of the lock and into the area of the inserted key; Fig. 20 is a vertical sectional view on the line 20—20 of Fig. 19; Fig. 21 is a vertical sectional view on the line 21—21 of Fig. 19; Fig. 22 is an end elevation of the rotatable barrel looking toward the left in Fig. 18; Fig. 23 is an elevation of the fragmentary portion of the rotatable barrel adjacent the free ends of the barrier planes and showing a fragmentary portion of the key inserted to receive the fins of the planes; Fig. 24 is a perspective view of a fragmentary portion of key employed with this type of lock; Fig. 25 is a sectional view of the lock of modified design in which the bolt is directly engaged by the key; Fig. 26 is a similar view with the key inserted; Fig. 27 is a sectional view on the line 27—27 of Fig. 26; Fig. 28 is a modification of the structure shown in Figs. 18 and 19; Fig. 29 is a similar view with the key inserted; Fig. 30 is a sectional view taken on the line 30—30 of Fig. 29; Fig. 31 is a modification of the structure shown in Figs. 1 and 2 with a connection between the segment and the bolt; Fig. 32 is a similar view with the key inserted; Fig. 33 is a sectional view taken on the line 33—33 of Fig. 32; Fig. 34 is a further modified construction thereof, the parts being shown shifted in dotted lines; and Fig. 35 is a sectional view on the line 35—35 of Fig. 34.

In Figs. 1 to 12, inclusive, an embodiment of the invention for the withdrawal of a sliding bolt and for the projection thereof is illustrated, and in this form of the invention the lock casing, which is indicated by the numeral 5, comprises a bottom portion 6 and a removable top plate 7 secured at its edge portion 8 by removable fastenings 9, preferably disposed at the corners of the casing. Slidably mounted in the casing is a bolt 10 which operates through an opening 11 and which is bifurcated to provide spaced upper and lower portions 12 having coöperating transverse slots 13 near the inner ends thereof. The bottom portion of the bolt is recessed, as shown at 14, to permit its inward movement whereby it may be fully drawn when the bolt is fully inclosed within the casing, this being necessary in view of the fact that the casing is provided with an auxiliary wall 15 which serves for the pivotal mounting of a segmental pinion 16 adjacent the edge portion of said wall as shown at 17. A pin 18 is carried by one corner of the segmental portion 16 and engages the alined slots 13 in the spaced plates or portions 12 of the bolt so that by imparting rotation to the segmental pinion it will be obvious that the bolt may be withdrawn or projected with facility.

The bolt is held normally projected by spring means, preferably in the form of a V-shaped spring 19 mounted between an edge wall of the casing and the inner end of the bolt, as is more clearly shown in Fig. 1 of the drawings. To draw the bolt, the top plate thereof is provided with a depending barrier pin 20 located substantially in line with the edge wall of the recessed part of the bottom plate of the bolt, and the said plate is also provided with a second depending barrier pin 21 located adjacent the inner edge of the bolt proper. The bottom plate or wall of the bolt is provided with an upstanding barrier pin 22 located intermediate the barrier pins 20 and 21, said pins upon the bolt being drawn being designed to enter the area of the segmental pinion through the instrumentality of a top groove 23 and a bottom groove 24, with the exception of the pin 21 which passes exteriorly of the area of the segmental pinion, as shown in Fig. 2 of the drawings. These parts are designed to operate by means of a key 25 which is capable of insertion into the lock casing through the instrumentality of a groove 26 communicating with the interior of the casing through one edge wall thereof and provided with a diagonally-extending wall 27 for a purpose to be hereinafter made apparent. The bottom wall groove 26 is provided with a guide lug 28 and the top wall is provided with a pair of spaced guide lugs 29 on either side thereof so as to enter a longitudinal bottom groove 30 centrally between the pressed edges of the key and a pair of spaced longitudinal grooves 31 in the top of the key, respectively. One edge of the key is provided with a rack 32 adapted to engage the teeth of the segmental pinion 16 whereby when the key is inserted, the engagement of such parts will cause partial rotation of the pinion which by reason of its sliding connection with the bolt will result in the latter being drawn. It will also be seen that as the key enters the channel formed in the bolt, as in the present instance, by the spaced upper and lower walls or plates 12, the key will move transversely of the bolt; and as the top face of the key is provided with diagonally-extending grooves 33 and 34 located in spaced relation and engaged by the barrier pins 20 and 21, respectively, and the bottom face of the key is provided with an intermediate groove or recess 35 engaged by the up-standing barrier pin 22, the bolt will be further shifted by the pressure of the pins against the inner walls of the grooves, with respect to the operating end of the key. This provides positive means for shifting the bolt and its operation but the barrier pins must be so mounted as to properly accord with the diagonal positions of the grooves in the key so as to travel freely through the grooves as the key is inserted and as the bolt is drawn or projected. It will also be obvious that the inner or far wall of the grooves in the key will engage the barrier pins to assist in the projection of the bolt together with the rack and pinion device heretofore described and the springs 19.

In order to lock the bolt in a drawn position, the end wall 36 of the channel in the bolt terminates in a projection 37 and the diagonal wall 27 of the casing terminates in a projection 38, said projections 37 and 38 being designed to engage a pair of notches 39 and 40 provided in opposite edges of the key and near the inner and outer ends thereof. When the bolt is fully drawn the key is rocked on one of the teeth of the pinion as a pivot so that the projections will engage in the respective notches, and by preventing outward movement or displacement of the key, the projection of the bolt under the action of the spring 19 is prevented.

In Figs. 13 to 17, inclusive, one modification of the adoption of the device to a lock employing a rotatable barrel is illustrated, and in this form of the invention the numeral 41 designates a stationary part of the barrel which is exteriorly threaded as shown at 42 for engagement with the lock casing and further provided with a flange 43 to limit its inward displacement. This stationary part of the barrel is provided to one side of its axis with a circular recess 44 rotatably receiving the operating or movable barrel 45, which is in the form of a cylinder and which at its inner end has a suitable operating crank or plate 46 secured thereto for connection to the bolt mechanism of the lock in any well known manner, not shown. The rotatable barrel 45 is provided with a longitudinal channel or slot 47 recessed transversely to receive a plurality of barrier planes 48 designed to slide at right angles to the length of an operating key 49 which is capable of insertion in the channel or slot. One wall of the channel is provided with a guide rib 50 and the opposed walls with a pair of spaced guide ribs 51 designed to engage corresponding longitudinal recesses 52 and 53, respectively, in the key. The barrier planes 48 are when normally projected designed to extend into the recesses 54 in the stationary barrel 41 and said planes near their inner and outer ends are provided with barrier pins 55, the outermost of which are designed to enter a longitudinal groove 56 in the key, while the innermost of said barrier pins by engagement with a series of elongated recesses and projections forming an irregular edge 57 at the opposite edge of the key, are designed to cause the barrier planes to be drawn into the area of the rotatable barrel 45 so as to permit rotation of the latter, it being understood that when the planes are projected as by means of coil springs 58 operating against the end walls of recesses 59 in the rotatable barrel and engaging projections 60 of the barrier planes, that said rotatable barrel is held against movement so that operation of the lock is prevented. Coöperating with the barrier planes 48 is a barrier plane 61 which is pivoted as shown at 62 to the opposed wall of the channel and held normally projected as by means of a spring 63 connected to one of the guide ribs and to the plane. This plane, which is illustrated more particularly in Fig. 16 of the drawings, is preferably in segmental form but is further provided with a projection 64 designed to limit its outward displacement under the action of the spring 63, when projected, to engage in a recess 65 in the stationary part of the barrel. A barrier pin 66 projects from the plane 61 in an opposite direction to the direction of projection of the barrier pins 55, and this pin enters a groove 53 which is widened at its mouth portion as shown at 67 so that the portion 68 will project beyond the edge wall of the groove at the inner side and thus causing the barrier pin 66 to pass into a diagonal recess or groove 69, which by reason of the pressure of the said wall of said groove against the barrier pin 66, will cause the plane 61 to be drawn into the area of the rotatable part of the barrel, thus removing all projecting means which would otherwise prevent its rotation. When the key is rotated the parts will assume the position desired, and it is to be understood that the operation of the rotatable part of the barrel will permit the bolt of the lock to be drawn or projected in the usual manner.

In the structure shown in Figs. 18 to 24, inclusive, the stationary part of the barrel is indicated by the numeral 70, and in the present instance receives the rotatable part 71 which is in turn provided with a longitudinal channel 72 communicating at substantially diametrically opposed sides with recesses 73 longitudinal of the stationary part of the barrel. A pair of barrier planes 74 extending lengthwise of the barrel are pivoted at their inner ends to the rotatable part as shown at 75 and at their free ends are enlarged as shown at 76 and in turn provided with barrier fins 77 extending at right angles thereto and designed to be accommodated within the channel 72 and the recesses 73. These barrier planes 74 are held in spaced relation by a spring 78 operating between the same and the pivoted ends of the planes are provided with inward extensions 79 having barrier pins 80 extending at right angles thereto preferably in the direction of extent of the barrier fins 77 for a purpose to be hereinafter made apparent. The key designed to coöperate with the above mechanism in this form of lock is indicated by the numeral 81 and has a reduced extension or bit 82 providing opposed shoulders 83 at either side thereof, and the key is further provided with a curved recess 84, designed by reason of the fact that the barrier fins 77 are formed on the chord of the circle described by the planes as they swing inward, to enter the recess 84, it being understood that the curvature of this recess corresponds to the arc described by such pins during the pivotal movement of the planes. Thus it will be seen that as the key is inserted and the shoulders 83 are caused to engage the barrier pins 80, that the planes will be moved on their pivots from the position shown in Fig. 18 of the drawings to the position shown in Fig. 19 of the drawings whereby the planes and the fins thereof will be drawn into the area of the channel in the rotatable part of the barrier. If the recess 84 were not provided, the planes would not be permitted to move transversely of the key and thus the insertion of the latter and the consequent operation of the lock could not occur, so that a key must be used with a particular arrangement of recesses to accord with the particular number of barrier planes and the arrangement and number of barrier pins and fins carried thereby. It will also be obvious that the arrangement of the grooves and recesses in the keys and the planes, pins and fins of the planes and of the bolt, wherein the principle is employed in connection with a lock having a sliding bolt, may be varied in numerous ways without departing from the spirit of the invention.

In Fig. 25 of the drawings, the casing structure is the same, but in lieu of the slidable bolt, a pivoted bolt 85 is provided, the same being pivoted as shown at 86 and having a serrated or toothed edge 87 and a key 88 is provided with a co-acting beveled and serrated or toothed edge 89, designed to co-act therewith for drawing or projecting the bolt. The bolt is further provided with projecting barriers 90 and the key with co-acting grooves or recesses 91, which as shown may extend entirely or partly across the lateral face of the key so as to permit insertion of the latter and consequent operation of the lock.

In the form of the invention shown in Fig. 28, the part 92 designates the casing of the lock, in which a bolt 93 is pivoted as shown at 94, said bolt having a reduced portion 95, terminating in an extension 96 adapted to be engaged by one end of a key 97 formed in the same manner as the key 81, except that it is provided with a single transverse recess or groove 98 to receive a barrier 99, projecting from the face of the bolt 93, whereby when the key engages the extension 96, the barrier will pass into the recess so as to permit the bolt to be drawn or projected and it is obvious that should the recess and barrier not aline the bolt cannot be drawn.

In the structure shown in Fig. 31 of the drawings, which is a modification of the structure shown in Figs. 1 and 2, the bolt 100 is connected to a toothed segment or segmental pinion 101 through the medium of a link or rocker arm 102, the connections being in the form of pivots 103. The segment 101 is provided with a barrier 104 and the link or rocker arm with a barrier or pin 105, adapted to engage recesses or grooves 106 and 107 respectively in a toothed key 108. These grooves or recesses are disposed in convergent relation to coöperate with the barriers in this form of the invention, to permit the insertion and withdrawal of the key and consequent operation of the lock.

In the structure shown in Fig. 34, an outer bolt 109 is employed similar to the bolt 85 and a toothed or serrated segment 110 is employed similar to the segment 101, but in lieu of the link or rocker arm connection 102, pinions 111 are journaled in the casing and engaged with both the bolt and the segment. The segment and one pinion are provided with barriers 112 and 113 respectively, adapted to pass into or through a pair of recesses or grooves 114 in a key 115 when the latter is inserted, so as to cause simultaneous pivoting of the bolt and segment with rotation of the pinions to permit the bolt to be drawn, while opposite movement of said parts will be effected when the key is withdrawn.

Having thus described my invention, I claim as new and desire to secure by Letters Patent:

1. In a lock, the combination with a casing and a part movable with respect to the casing, of a pivoted member carried by the casing and slidably engaged with said movable part, a key adapted to coöperate with said pivoted member to cause partial rotation of the latter and to shift the movable part into and out of the casing, and means independent of the movable part and pivoted member for holding the key in a position with the movable part located within the area of the casing.

2. The combination with a lock casing and movable barriers to the introduction of the key mounted in said casing; of a key grooved transversely across its faces to match said barriers to permit the introduction of the key and operation of the lock.

3. In a lock, a bolt carrying barriers to the introduction of the key and a key transversely grooved across its faces to match said barriers thereby permitting operation of the lock when the key is inserted.

4. In a lock, the combination with a serrated pivoted bolt; of a grooved key with serrated edge, engaging the serrated bolt, spaced barriers carried by the bolt to enter said grooves, permitting the operation of the lock.

5. In a lock, a bolt carrying barriers to the introduction of the key and connected with a serrated segment, a key with serrated edge engaging said segment and grooved transversely to match said barriers, thereby permitting the operation of the lock by receiving the barriers when the key is operated.

6. In a lock, a bolt carrying barriers across the path of the key and connected with a serrated segment, a key with serrated edge and having grooves matching said barriers and impinging thereon, thereby causing the operation of the lock.

7. In a lock, a bolt, means for causing its movement, said means carrying barriers across the path of the key, a key grooved across one or both faces to match said barriers, thereby permitting the operation of the lock.

8. In a lock, a bolt, means for causing its movement, said means carrying barriers to the introduction of the key, a key grooved diagonally on one face to match said barriers, and operating when inserted by impinging upon them causing the operation of the lock.

9. A structure as characterized embodying a key, a rotatable barrel containing a channel for receiving said key, barrier planes normally projecting through longitudinal openings in the side of said barrel into corresponding openings in the lock casing, said barrier planes retractable into said barrel by the engagement of the end of said key with barriers attached to said barrier planes, other barriers attached to said barrier planes carried by said barrier planes across said channel in the path of said key, and grooves formed in said key for the passage of said barriers, said grooves corresponding with the path of said barriers relative to said key.

10. A structure as characterized embodying a key with one or both edges serrated or undulatory, a rotatable barrel containing a channel for receiving said key, barrier planes normally projecting through longitudinal openings in the side of said barrel into corresponding openings in the lock casing, said barrier planes retractable into said barrel by the engagement of the serrated or undulatory edge of the key which is farthest from the projecting portion of the barrier planes with barriers attached to said barrier planes, other barriers attached to said barrier planes carried by said barrier planes across said channel in the path of said key, and grooves formed in said key for the passage of said barriers, said grooves corresponding with the path of said barriers relative to said key.

11. A structure as characterized comprising a body embodying a key-receiving channel; barriers movable transversely through said channel; and a key insertible lengthwise in said channel for moving said barriers, said key having shallow grooves in the sides thereof forming passages for said barriers, the angles of said grooves being the mean of travel of said key and said barriers.

In witness whereof I have signed my name to this specification in the presence of two subscribing witnesses.

FRANK G. NELSON.

Witnesses:
JOHN E. BURCH,
PHILIP D. ROLLHAUS.